US009547905B2

(12) United States Patent
Warzelhan et al.

(10) Patent No.: US 9,547,905 B2
(45) Date of Patent: Jan. 17, 2017

(54) MONITORING SYSTEM WITH A POSITION-DEPENDENT PROTECTED AREA, METHOD FOR MONITORING A MONITORING AREA AND COMPUTER PROGRAM

(71) Applicant: Robert Bosch GmbH, Stuttgart (DE)

(72) Inventors: Jan Karl Warzelhan, Bad Salzdetfurth Ot Heinde (DE); Daniel Gottschlag, Nuremburg (DE); Frank Mattern, Lauf An Der Pegnitz (DE); Jan Rexilius, Hannover (DE); Holger Fillbrandt, Bad Salzdetfurth (DE); Stephan Heigl, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/414,543

(22) PCT Filed: Jun. 26, 2013

(86) PCT No.: PCT/EP2013/063355
§ 371 (c)(1),
(2) Date: Jan. 13, 2015

(87) PCT Pub. No.: WO2014/012753
PCT Pub. Date: Jan. 23, 2014

(65) Prior Publication Data
US 2015/0193936 A1    Jul. 9, 2015

(30) Foreign Application Priority Data

Jul. 18, 2012  (DE) ........................ 10 2012 212 613

(51) Int. Cl.
*G06K 9/00* (2006.01)
*H04N 7/18* (2006.01)
(Continued)

(52) U.S. Cl.
CPC ......... *G06T 7/0046* (2013.01); *G06K 9/00771* (2013.01); *G08B 13/19608* (2013.01);
(Continued)

(58) Field of Classification Search
USPC ............... 382/100, 103, 106–107, 123, 155, 162,382/168, 173, 181, 203, 209, 219, 232, 254,382/274, 276, 286–291, 305, 312; 348/159; 340/568.1
See application file for complete search history.

(56) References Cited

U.S. PATENT DOCUMENTS

| 2009/0060276 A1* | 3/2009 | Yu ...................... G06K 9/00771 382/103 |
| 2009/0189983 A1* | 7/2009 | Brumfield ........ G08B 13/19613 348/159 |
| 2010/0194566 A1* | 8/2010 | Monden .................... G07C 9/00 340/568.1 |

FOREIGN PATENT DOCUMENTS

| DE | 102007041893 | 3/2009 |
| EP | 1403817 | 3/2004 |

(Continued)

OTHER PUBLICATIONS

International Search Report for Application No. PCT/EP2013/063355 dated Oct. 16, 2013 (English Translation, 3 pages).

*Primary Examiner* — Seyed Azarian
(74) *Attorney, Agent, or Firm* — Michael Best & Friedrich LLP

(57) ABSTRACT

A monitoring system for monitoring a monitoring area, having an input interface for accepting monitoring images of the monitoring area, having a localization module for locating at least one moving monitoring object in the monitoring area, wherein the localization module is designed to locate a position of the monitoring object, having a definition module for defining a position-dependent protected area in
(Continued)

6a-6c. POSITION-DEPENDENT PROTECTED AREA
7. MONITORING OBJECT
8. ONE FURTHER OBJECT the monitoring area, and having a monitoring module for monitoring the protected area, wherein the definition module is designed to define the position-dependent protected area on the basis of the position of the moving monitoring object.

15 Claims, 2 Drawing Sheets

(51) Int. Cl.
  *G06T 7/00* (2006.01)
  *G08B 13/196* (2006.01)
  *G08B 21/22* (2006.01)

(52) U.S. Cl.
  CPC . *G08B 13/19615* (2013.01); *G08B 13/19652* (2013.01); *G08B 21/22* (2013.01); *H04N 7/181* (2013.01); *G06T 2207/10016* (2013.01); *G06T 2207/20104* (2013.01); *G06T 2207/30232* (2013.01); *G06T 2207/30241* (2013.01); *G08B 13/19613* (2013.01); *G08B 13/19647* (2013.01)

(56) References Cited

FOREIGN PATENT DOCUMENTS

| EP | 1703437 | 9/2006 |
| EP | 1713275 | 10/2006 |
| EP | 2442286 | 4/2012 |

* cited by examiner

MONITORING SYSTEM WITH A POSITION-DEPENDENT PROTECTED AREA, METHOD FOR MONITORING A MONITORING AREA AND COMPUTER PROGRAM

BACKGROUND OF THE INVENTION

The invention relates to a monitoring system for monitoring a monitoring area, having an input interface for accepting monitoring images of the monitoring area, having a localization module for locating at least one moving monitoring object in the monitoring area, wherein the localization module is designed to locate a position of the monitoring object, having a definition module for defining a position-dependent protected area in the monitoring area, and having a monitoring module for monitoring the protected area. The invention also relates to a method for monitoring a monitoring area as well as a corresponding computer program.

The practice of monitoring public places, buildings, production halls etc. using monitoring cameras is frequently used nowadays. The evaluation of the image data streams generated by the monitoring cameras is often carried out by security personnel who receive said image data streams displayed on monitors and visually examine the same. As studies have shown, the attention of the security personnel being employed drops over time, so that, in statistical terms, relevant activities in the image data streams are already overlooked after approximately 20 minutes. In order to improve the monitoring security, automatic video analyses are used which examine the image data streams by means of digital image processing and can automatically detect and report relevant activities in this way. A high degree of monitoring security can be achieved from this interaction between the visual examination of the security personnel and the automated monitoring on the basis of the video analyses.

The German patent publication DE 10 2007 041 893 A1, which arguably represents the closest prior art, describes a method as well as a device for detecting and/or tracking moving objects in a monitoring scene. In the monitoring scene, a plurality of static regions are defined which are selectively observed. According to the invention, provision is made for different monitoring rules to be applied in each of the selected regions. The regions are defined as areas in the monitoring scene.

SUMMARY OF THE INVENTION

A monitoring system having the features of claim 1, a method for monitoring a monitoring area having the features of claim 11 as well as a computer program having the features of claim 12 are proposed within the scope of the invention. Preferred or advantageous embodiments of the invention ensue from the dependent claims, the subsequent description as well as from the attached drawings.

The invention relates to a monitoring system for monitoring a monitoring area. The monitoring area is, for example, a public place, a business property, one or more rooms in a building, a street intersection or one or a plurality of streets etc.

The monitoring system comprises an input interface which is designed to accept monitoring images of the monitoring area. The monitoring images show the monitoring area or a partial section thereof. In a very preferred manner, the monitoring images form an image sequence; thus enabling the monitoring area or the partial section thereof to be shown at different points in time. The monitoring images form, in particular, a monitoring video.

The monitoring system can be connected to a storage device in which the monitoring images are deposited. The monitoring system is alternatively or additionally connected to one or a plurality of monitoring cameras which are directed onto the monitoring area and provide the monitoring images. The monitoring system optionally comprises the one or plurality of monitoring cameras and/or the storage device.

The monitoring system comprises a localization module which is designed to locate at least one moving monitoring object in the monitoring area. The moving monitoring object is particularly an object which moves in front of a stationary or quasi-stationary background. The monitoring object is, for example, embodied as one or a plurality of persons, a vehicle, a car, a package or a bicycle etc. The localization module is designed to locate a position of the monitoring object, in particular in the monitoring area. The localization module can preferably output a current position of the monitoring object as an outcome. The moving object does not have to be constantly in motion. It is also possible that the moving object temporarily stays at one position.

The monitoring system further comprises a definition module which is designed to define a position-dependent protected area as well as a monitoring module which is designed to monitor the protected area. A protected area can be defined via the definition module, in particular in the monitoring area, said protected area being determined by means of position information. The monitoring module is designed to carry out the monitoring on the basis of the position-dependent protected areas. It is thereby possible to monitor subareas in the monitoring area and to leave other subareas unmonitored. It is particularly possible to adapt the protected area to "regions of interest" (ROI—region of interest). The protected area is, in particular, designed as a subarea, especially as a spatial subarea of the monitoring area. In particular, the protected area can be implemented by means of a surface, e.g. on the bottom of the monitoring area, or by a volume in the monitoring area.

According to the invention, the definition module is designed within the scope of the invention to define the position-dependent protection area on the basis of the position of the moving monitoring object, wherein the position is located by means of the localization module. The definition module is particularly designed to define the protected area at a first position of the monitoring object, provided that the first and the second position of the monitoring object are different.

It is an advantage of the invention that protected areas cannot only be defined statically in the monitoring area—as was known up until now; but can be defined on the basis of a moving monitoring object. It is thereby possible to associate a protected area with the monitoring object, said protected area being moved along with the monitoring object or being moved to follow said object.

It is also possible to associate the protected area with the moving monitoring object—preferably as an individualized, virtual protective shield, wherein the protected area is carried along with every change in position of the monitoring object in the monitoring area. This has the advantage that the monitoring security can be significantly improved for the monitoring object.

In a preferred embodiment of the invention, the monitoring object is configured as a person or as a vehicle. In both embodiment alternatives, the protected area which is either moved along with or moved to follow the monitoring object allows for an improved monitoring of said object.

It is thus, for example, possible to optionally provide a suspicious person with a protected area; thus enabling the member of the monitoring personnel to automatically monitor with whom the suspicious person has met. In so doing, all persons are automatically detected with whom the suspicious person has met by the system monitoring which persons have come in contact with the protected area of the suspicious person.

As an alternative thereto, a person to be protected can also be provided with a protected area, which is moved to follow the person to be protected, wherein the system automatically monitors if other persons intrude into the protected area of the person to be protected. In this way, an attack or something similar on said person to be protected is automatically detected.

Besides monitoring people, the protected area which is moved along with the monitoring object can also be used with other monitoring objects. For example, a vehicle, in particular a transport vehicle for hazardous goods, can be monitored, wherein the protected area being carried along with the monitoring object, e.g., ensures that a certain minimum distance to the vehicle is maintained. When an intrusion of other vehicles, persons or objects into the protected area occurs, it can be concluded that the minimum distance to the vehicle has been violated. An automated alarm can, e.g., be triggered via the monitoring module as a response to the protected area having been contacted.

In all of the aforementioned exemplary scenarios, the monitoring by means of the monitoring system is significantly simplified by means of defining the moving protected area.

In a first possible embodiment of the invention, the protected area is defined by a line, in particular at least or exactly one line or a polyline, i.e. a line that does not run rectilinearly, in the monitoring scene displayed on the monitoring images. In this first possible embodiment, the line for defining the protected area can be used in the monitoring scene that is displayed, wherein, e.g., a transgression of said line by other objects leads to an alarm being generated by the monitoring module. It is thereby also possible for the line to be closed, i.e. forming, e.g., a circle or a polygon, so that the monitoring object is disposed within the closed line, wherein an alarm is triggered by the monitoring module if the line is transgressed or if another object is situated for a predetermined amount of time within the closed line.

In a preferred modification to the invention, the monitoring system comprises a model module, which provides a scene model, in particular a 3D model of the monitoring area. The scene model can be automatically detected by the monitoring system. Said scene model can however also be manually generated as a 3D model and deposited in the model module. The model module particularly models the static and/or quasi-static scene background, i.e. the areas of the monitoring area which do not or only very slowly change. In this embodiment, it is preferred that the localization module locates the position of the monitoring object in the scene module, in particular with respect to the scene model and that the position-dependent protected area is defined on the basis of the position in the scene module. The position of the monitoring object and the protected area is virtually depicted in this modification to the invention.

In a first possible alternative, the protected area is defined in the scene model by an optionally closed line, in particular by at least or exactly one line or a polyline. This configuration has the advantage that the line, the polyline or the closed line can, for example, be projected onto a base of the monitoring area, so that all objects which cross the line and thereby violate said line penetrate into the protected area or make contact with the same. A closed line can, for example, be drawn around the monitoring object, said line defining a minimum distance to the monitoring object as a protected area.

In a second possible alternative, the protected area is defined by a volume in the scene module. Such a volume can, for example, be defined as a cuboid; it can however also be defined as an extrusion of the closed line to a certain height, wherein each object violates the protected area which penetrates the volume and thereby violates the same. It is also possible for the volume to have a free form and to be adapted to the respective application. Such volumes can be easily created and displaced in modern 3D CAD modeling programs.

In principle, it is possible for the localization of the at least one moving object in the monitoring area to take place by means of a detection device, which is arranged in the monitoring area. It is thus, for example, conceivable that the monitoring object carries a transmitter which can be regionally located by means of receivers, wherein the localization model locates this position as the position of the monitoring object.

It is however preferred that the localization model comprises a detection unit for detecting the monitoring object as well as a tracking unit; thus enabling the position of the monitoring object to be acquired with the aid of the monitoring images by means of image processing. Methods for detecting and tracking monitoring objects by means of image processing, in particular digital image processing, are known. For example, reference can be made to the article: A. Yilmaz, O. Javed and M. Shah, "Object Tracking: a Survey". ACM Computing Surveys, Vol. 38(4), Article 13, 2006 with regard to possible implementations. In this preferred configuration, the monitoring images form a monitoring video comprising a plurality of temporally consecutive monitoring images. In a first step of a possible embodiment, moving areas in the monitoring images are extracted from the static or quasi-static scene background, e.g. by calculating the difference between a current monitoring image and a scene reference image. In the next step, the moving areas are segmented and thereby produce possible moving objects. These possible monitoring objects are then tracked over a plurality of monitoring images; thus enabling a line of movement or trajectory of the moving object, in particular the moving monitoring object, to be generated.

In one preferred embodiment of the invention, the protected area is carried along this line of movement. For example, the protected area is displaced in parallel along the line of movement synchronously to the movement of the moving monitoring object.

In one possible configuration of the invention, provision is made for the definition module to define the protected area by means of user interaction. In order to define the protected area in the displayed monitoring scene, provision can thus be made for a user to enter a line or a polyline around the monitoring object using a computer input device, such as, e.g., a touchpad or a mouse, by the line being plotted in the monitoring image. The plotted line is moved parallel to the monitoring object in the monitoring image or, respectively, in the monitoring scene. Provision can alternatively be made for the protected area to be entered into the scene model by a user. It is thus, for example, conceivable for the user to draw in a closed line around the monitoring object in the scene module using the input device and in this way to define the protected area relative to the position of the monitoring object.

In other possible modifications to the invention, provision can also be made for the protected area to be semi-automatically or automatically defined. It is thus possible for an object class, such as, e.g., persons, vehicles etc., to be manually or automatically associated with the monitoring object via object detection and for the protected area to be defined on the basis of the object class. As a result, it is possible that a plurality of object classes is presented to the user for selection, so that the object class and the protected area are defined semi-automatically. It is also possible for the monitoring system to automatically detect the object class of the monitoring object and to define the protected area on the basis of a set of guidelines.

Provision is made in a modification to the invention for the protected area to be automatically adapted using object properties of the moving monitoring object. Such an object property is, for example, the speed of the monitoring object in the monitoring area. Provision can, for example, thus be made for the protected area to be changed at higher speed. If the monitoring object moves faster, the protected area is enlarged because the monitoring object poses an increased risk or the monitoring object requires a longer time to come to rest.

In one preferred embodiment of the invention, the monitoring module is designed to emit an alarm for the case that another object has come in contact with the protected area, in particular has violated said protected area, and/or that another object has stayed in the protected area for a specifiable minimum amount of time and/or that another object carries out certain actions in the protected area or after leaving said protected area, such as, e.g., a rapid departure, which can be detected by suitable image processing methods.

A further subject matter of the invention relates to a method for monitoring the monitoring area while using the monitoring system according to one of the preceding claims or how said system was previously described.

A final subject matter of the invention relates to a computer program having the features of claim 12.

BRIEF DESCRIPTION OF THE DRAWINGS

Further features, advantages and effects of the invention ensue from the following description of a preferred exemplary embodiment as well as from the attached drawings. In the drawings.

DETAILED DESCRIPTION

Figure 1:
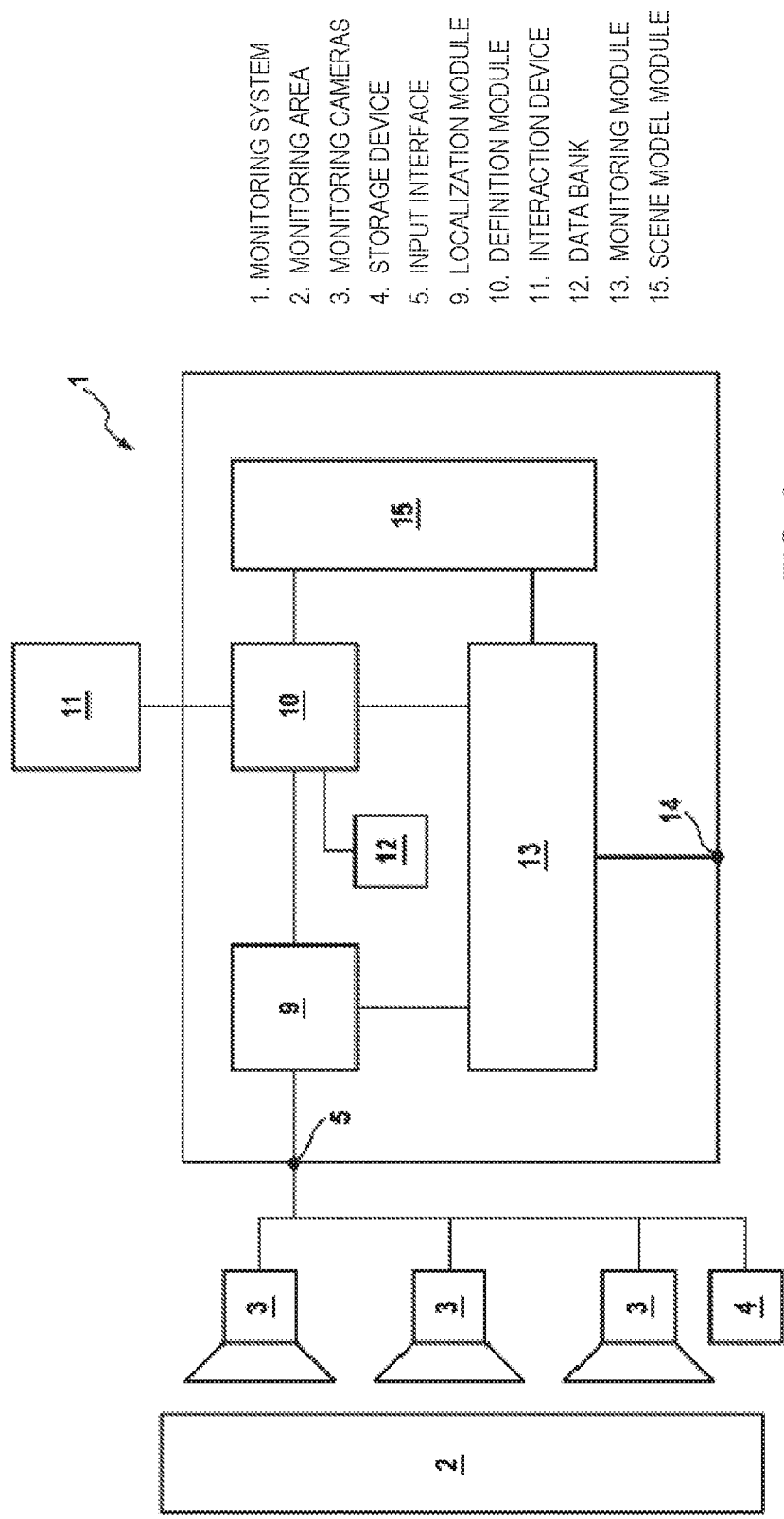
FIG. 1 shows a schematic block diagram of a monitoring system as an exemplary embodiment of the invention.

A monitoring system 1 as an exemplary embodiment of the invention is shown in FIG. 1 in a schematic block diagram. The monitoring system serves to monitor a monitoring area 2 and is and/or can be, for example, connected to a plurality of monitoring cameras 3. The monitoring system 1 is alternatively or additionally connected to a storage device 4 which stores or intermediately stores monitoring images from the monitoring cameras 3 and outputs the same to the monitoring system 1. The monitoring system 1 optionally comprises the monitoring cameras 3 and/or the storage device 4.

The monitoring area 2 can, for example, be configured as a public place, a street lined with houses or also the inside of a building. It is thereby possible for the monitoring area to be designed contiguously or—depending on the distribution of the monitoring cameras 3—in a fragmented or non-contiguous manner.

The monitoring system 1 comprises an input interface 5, via which the monitoring images of the monitoring camera 3, if applicable via intermediate storage in the storage device 4, are transferred to the monitoring system 1. The data coupling can thereby take place in a wired or wireless manner and/or via the internet.

The monitoring system 1 is designed to define a position-dependent protected area 6a, b, c (FIG. 2) on the basis of the position of a monitoring object 7 and to carry along said protected area with the monitoring object 7 in the monitoring area 2.

For reason of explanation, it is assumed that the monitoring object 7 as well as at least one further object 8 is present in the monitoring area 2. Both objects 7, 8 are designed as moving objects, i.e. as objects which move in the monitoring area 2 with respect to a static or quasi-static background.

The monitoring system 1 comprises a localization module 9 for locating the monitoring object 7 and optionally the further object 8. The selection of the monitoring object 7 can be performed manually by the user or automatically. A user can, for example, select the monitoring object by selecting, in particular clicking, with an interaction device 11, e.g. a computer mouse, a touchpad or something similar. The locating of the further object 8 can also be implemented in another module. As an outcome, the localization module outputs a current position of the monitoring object 7 as well as optionally in addition a current position of the further object 8. The localization module 9 particularly comprises a detection unit and a tracking unit, wherein the detection unit enables a detection or recognition of the monitoring object by means of digital image processing; and the tracking unit enables the tracking of the monitoring object across a plurality of monitoring images, so that a current position of the monitoring object 7 is ascertained for each monitoring image or a line of movement of the monitoring object 7 is ascertained across a plurality of monitoring images and therefore over time.

The current position of the monitoring object 7 is transferred to a definition module in which the position-dependent protected area 6a, b, c is assigned to the monitoring object. When initializing or redefining the protected area 6a, b, c, the protected area 6a can either be manually, semi-automatically or even fully automatically assigned to the monitoring object.

When manually assigning the protected area to the monitoring object, provision is, for example, made for a user to define the protected area 6a via the interaction device 11 by marking geometrical primitives around the monitoring object 7.

When semi-automatically defining the protected area 6a, provision can be made for the monitoring system 1, in particular the definition module 10, to propose different options for a protected area 6a, wherein one of the options is selected by the user via the interaction device 11. When automatically defining the protected area 6a, the definition takes place on the basis of further image processing outcomes, such as, e.g., detection of persons, situation evaluation, in particular time of day, full/empty scene etc. Data that may be necessary for semi-automatic or fully automatic definition of the protected area are retrieved from a data bank 12.

Figure 2:
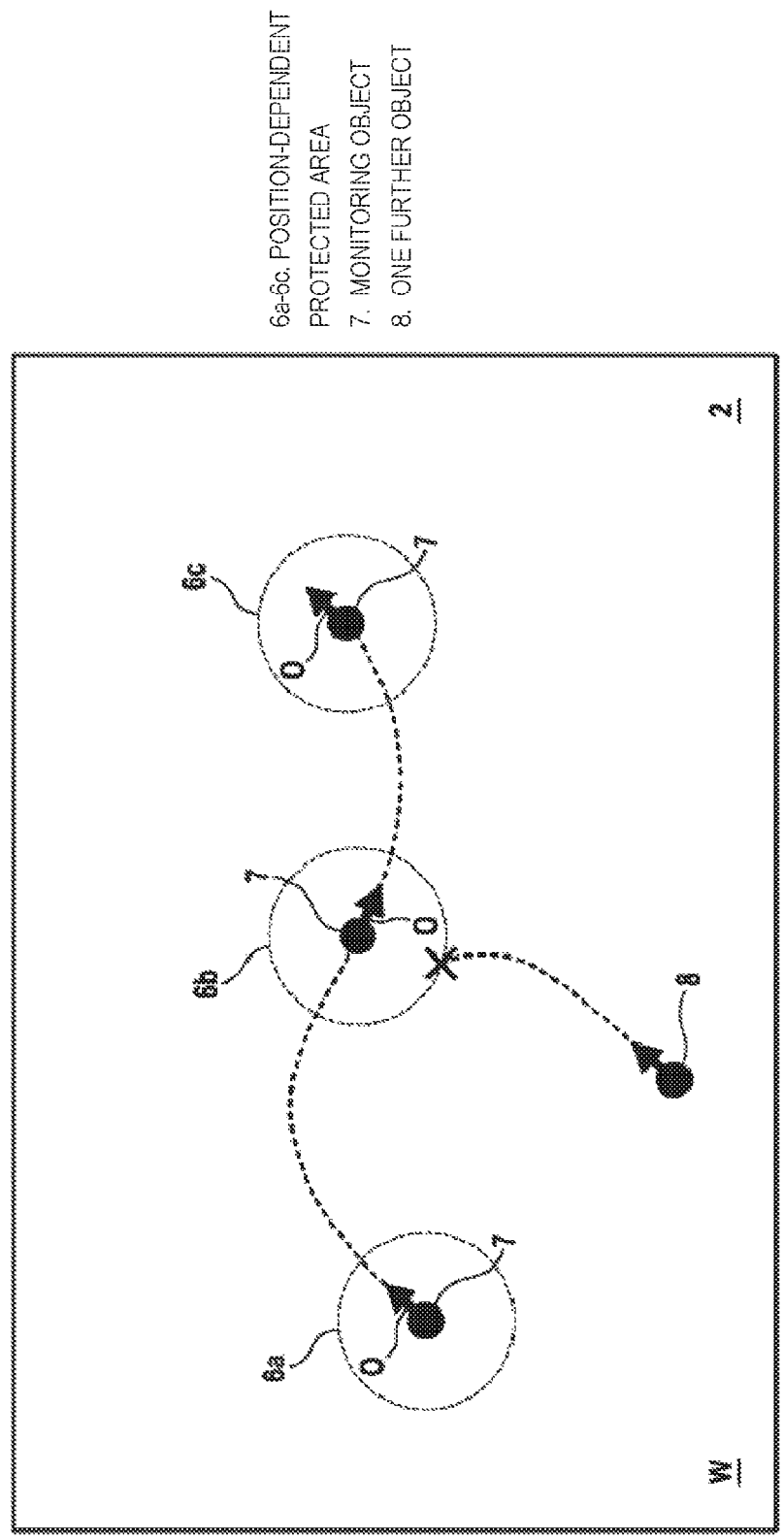
FIG. 2 shows, by way of example, a monitoring scene for illustrating the operation of the monitoring system in FIG. 1.

The definition module 10 is designed to displace the protected area 6a on the basis of the position of the monitoring object 7 in order, in this way, to generate the further protected areas 6b, c. Thus, the protected area 6a in FIG. 2 is displaced parallel to the movement of the monitoring object 7, wherein the protected areas 6a, b, c, as viewed spatially, assume in each case the same relative position to the monitoring object 7.

The protected areas 6a, b, c defined in this manner are transferred from the definition module 10 to a monitoring module 13. The position of the further object 8 is likewise transferred from the localization module 9 or from another module to a monitoring module 13. The monitoring module 13 is designed to check whether the further object 8 violates, contacts or leaves the protected area 6a, b, c.

For the purpose of checking, a predefined rule can be deposited in the data bank 12, wherein a check is performed by the monitoring module 13 as to whether the further object 8 enters the protected area 6a, b, c, the further object 8 remains for a predefined minimum amount of time in the protected area 6a, b, c or whether the further object 8 carries out suspicious actions with respect to or within the protected area 6a, b, c.

If the monitoring module 13 has determined that the further object 8 has violated or come in contact with the protected area 6a, b, c, an alarm is triggered via an alarm interface 14, e.g., to the user or a member of the monitoring personnel.

In this connection, it is also possible that the monitoring object 7 remains at a position and the further object 8 comes in contact with the protected area 6a, b, c.

Within the scope of the exemplary embodiment described above, different variants and optional additions are possible:

In one possible simple embodiment, the monitoring object 7 as well as the further object 8 is treated only two dimensionally, i.e. there is no depth information used in this embodiment. The detection of the objects 7, 8 takes place in a known manner by virtue of the fact that all of the moving objects are extracted from the static background, e.g. by subtraction of the current monitoring image from a reference image. In a succeeding step, the objects are detected and tracked across a plurality of monitoring images. The positions of the monitoring object 7 as well as of the further object 8 are only displayed in image coordinates of the monitoring image. In this simple embodiment, the protected areas 6a, b, c are interactively plotted by the user and likewise only defined in the image plane, wherein an alarm is emitted to the alarm output interface 14 as soon as the position of the further object 8 is disposed within the protected area 6a, b, c.

In another embodiment of the invention, the monitoring system 1 comprises a scene model module 15 in which a three dimensional model of the monitoring area 2 is deposited. In this embodiment, the positions of the two objects 7, 8 are determined in the scene model and therefore three dimensionally. The protected area 6a, b, c is defined three dimensionally. In this embodiment, it is possible for a line or a polyline to be defined at the bottom of the monitoring region, wherein an alarm is emitted to the alarm output interface 14 as soon as the further object 8 has come in contact with or violated the protected area 6a, b, c. It is however also possible for a volume in the scene model to be defined as the protected area 6a, b, c which is carried along with the monitoring object 7.

From a mathematical standpoint, the monitoring area 2 defines a world coordinate system W in which the monitoring object 7 and the further object 8 move. The monitoring object 7 defines an object coordinate system O which is carried along and the origin of which is defined by the position of the monitoring object 7 and the orientation of which is either defined by the orientation of the monitoring object 7 or is specified. The protected area 6a, b, c assumes in each case the same position in the object coordinate system O, is however displaced in the world coordinate system W together with the monitoring object 7 or, respectively, the object coordinate system thereof.

In a possible addition to the aforementioned exemplary embodiments, an automatic adaptation of the protected area 6a, b, c can be carried out for the monitoring object 7 in order to be able to respond to changed object properties. The protected area 6a, b, c could thus, for example, change on the basis of the speed of the monitoring object 7. If the monitoring object 7 moves faster, the protected area 6a, b, c is enlarged because the monitoring object 7 poses an increased risk or said monitoring object 7 requires a longer time to come to rest.

The invention claimed is:

1. A monitoring system for monitoring a monitoring area, the monitoring system comprising:
   an input interface configured to accept monitoring images of the monitoring area; and
   a computer configured to
      locate at least one moving monitoring object in the monitoring area and locate a position of the monitoring object,
      define a position-dependent protected area including at least one boundary line in the monitoring area on the basis of the position of the moving monitoring object, wherein the position-dependent protected area is carried along with the monitoring object along a line of movement of said monitoring object in the monitoring area, and
      trigger an alarm state if one, several, or all of the following conditions are met:
         another object transgresses the at least one boundary line of the position-dependent protected area;
         the another object remains for a predetermined amount of time in the position-dependent protected area; and
         the another object carries out actions according to a predetermined pattern while in contact or after contact with the position-dependent protected area.

2. The monitoring system according to claim 1, wherein the position-dependent protected area is defined by an optionally closed line in a monitoring scene displayed on the monitoring images.

3. The monitoring system according to claim 1, wherein the computer is configured to receive a scene model of the monitoring area, wherein the position-dependent protected area is defined by an optionally closed line in the scene model.

4. The monitoring system according to claim 1, wherein a scene model module provides a scene model of the monitoring area, wherein the position-dependent protected area is defined by a volume in the scene model.

5. The monitoring system according to claim 1, wherein the computer is configured to locate at least one moving monitoring object in the monitoring area and locate a position of the monitoring object by image processing on the basis of the monitoring images.

6. The monitoring system according to claim 1, wherein the computer is configured to define the position-dependent protected area based on user interaction.

7. The monitoring system according to claim 1, wherein the computer is configured to define the position-dependent protected area on the basis of a class of the monitoring object.

8. The monitoring system according to claim 1, wherein the computer is configured to define the position-dependent protected area on the basis of object properties of the monitoring object.

9. A method for monitoring the position-dependent protected area using the monitoring system according to claim 1, wherein the position-dependent protected area is moved to follow the moving monitoring object on the basis of the position of said moving monitoring object.

10. A monitoring system for monitoring a monitoring area, the monitoring system comprising:
an input interface configured to accept monitoring images of the monitoring area;
a monitoring camera connected to the input interface, the monitoring camera configured to generate the monitoring images; and
a computer connected to the input interface and the monitoring camera, the computer configured to
locate at least one moving monitoring object in the monitoring area and locate a position of the monitoring object;
define a position-dependent protected area including at least one boundary line in the monitoring area on the basis of the position of the moving monitoring object, wherein the position-dependent protected area is carried along with the monitoring object along a line of movement of said monitoring object in the monitoring area;
monitor the position-dependent protected area; and
trigger an alarm state if all of the following conditions are met:
another object transgresses the at least one boundary line of the position-dependent protected area;
the another object remains for a predetermined amount of time in the position-dependent protected area; and
the another object carries out actions according to a predetermined pattern while in contact or after contact with the position-dependent protected area.

11. The monitoring system according to claim 10, wherein the position-dependent protected area is defined by an optionally closed line in a monitoring scene displayed on the monitoring images.

12. The monitoring system according to claim 10, wherein the computer is configured to receive a scene model of the monitoring area, and wherein the position-dependent protected area is defined by an optionally closed line in the scene model.

13. The monitoring system according to claim 10, wherein the computer is configured to receive a scene model of the monitoring area, and wherein the position-dependent protected area is defined by a volume in the scene model.

14. The monitoring system according to claim 10, wherein the computer is configured to detect and track the at least one moving monitoring object; thus enabling the position of the monitoring object to be determined by image processing on the basis of the monitoring images.

15. A monitoring system for monitoring a monitoring area, the monitoring system comprising:
an input interface configured to accept monitoring images of the monitoring area;
a monitoring camera connected to the input interface, the monitoring camera configured to generate the monitoring images; and
a computer connected to the input interface and the monitoring camera, the computer configured to
locate at least one moving monitoring object in the monitoring area and locate a position of the monitoring object;
define a position-dependent protected area including at least one boundary line in the monitoring area on the basis of the position of the moving monitoring object, wherein the position-dependent protected area is carried along with the monitoring object along a line of movement of said monitoring object in the monitoring area;
monitor the position-dependent protected area; and
trigger an alarm state if all of the following conditions are met:
another object transgresses the at least one boundary line of the position-dependent protected area; and
the another object remains for a predetermined amount of time in the position-dependent protected area.

\* \* \* \* \*